(12) United States Patent
Narayanan et al.

(10) Patent No.: US 8,601,446 B2
(45) Date of Patent: Dec. 3, 2013

(54) COMPLEXITY DEPENDENCY CHANGE IMPACT SYSTEM AND METHOD

(75) Inventors: Ajikumar Thaitharanikarthu Narayanan, Bangalore (IN); Ramprasad Malavalli Krishnamurthi, Malavalli (IN)

(73) Assignee: Wipro Limited, Bangalore (IN)

( * ) Notice: Subject to any disclaimer, the term of this patent is extended or adjusted under 35 U.S.C. 154(b) by 1254 days.

(21) Appl. No.: 12/255,669

(22) Filed: Oct. 22, 2008

(65) Prior Publication Data

US 2010/0100874 A1    Apr. 22, 2010

(51) Int. Cl.
*G06F 9/44* (2006.01)
*G06F 9/45* (2006.01)
*G06F 7/00* (2006.01)

(52) U.S. Cl.
USPC .......... 717/131; 717/124; 717/126; 717/144; 707/790

(58) Field of Classification Search
None
See application file for complete search history.

(56) References Cited

U.S. PATENT DOCUMENTS

| | | | | |
|---|---|---|---|---|
| 6,988,186 | B2* | 1/2006 | Eickemeyer et al. | 712/217 |
| 7,363,618 | B2* | 4/2008 | Pal et al. | 717/131 |
| 7,584,455 | B2* | 9/2009 | Ball | 717/124 |
| 7,822,795 | B2* | 10/2010 | Sangal et al. | 707/790 |
| 8,266,593 | B2* | 9/2012 | Narayanan et al. | 717/124 |
| 8,402,440 | B2* | 3/2013 | Sankaranarayanan et al. | 717/126 |
| 2003/0037314 | A1* | 2/2003 | Apuzzo et al. | 717/125 |
| 2004/0034662 | A1* | 2/2004 | Austin et al. | 707/104.1 |
| 2004/0133880 | A1* | 7/2004 | Paternostro et al. | 717/124 |
| 2005/0160411 | A1* | 7/2005 | Sangal et al. | 717/144 |
| 2008/0046867 | A1* | 2/2008 | Pal et al. | 717/131 |
| 2008/0189308 | A1* | 8/2008 | Sangal et al. | 707/100 |
| 2009/0132991 | A1* | 5/2009 | Ganai et al. | 716/18 |
| 2010/0138812 | A1* | 6/2010 | Narayanan et al. | 717/131 |

OTHER PUBLICATIONS

Simon Austin et al. "Analytical Design Planning Technique: a model of the detailed building design process", [Online], 1999, pp. 279-296, [Retrieved from Internet on Sep. 21, 2013], <http://www.sciencedirect.com/science/article/pii/S0142694X98000386>.*

Tian-Li Yu et al., "Dependency Structure Matrix, Genetic Algorithms, and Effective Recombination", [Online], 2009, pp. 595-626, [Retrieved from Internet on Sep. 21, 2013], <http://www.mitpressjournals.org/doi/pdfplus/10.1162/evco.2009.17.4.17409>.*

J.Hartmann et al., "Revalidation During the Software Maintenance Phase", [Online], 1989, pp. 70-80, [Retrieved from Internet on Sep. 21, 2013], <http://ieeexplore.ieee.org/stamp/stamp.jsp?tp=&arnumber=65195>.*

(Continued)

*Primary Examiner* — Thuy Dao
*Assistant Examiner* — Ziaul A Chowdhury
(74) *Attorney, Agent, or Firm* — LeClairRyan, a Professional Corporation

(57) ABSTRACT

A complexity dependency change impact system and method is disclosed. In one embodiment, a method of determining an efficient software testing scheme based on a dependency structure matrix (DSM) analysis includes generating a compressed DSM based on cyclic blocks associated with modules of a software application, tagging and levelling the modules of the software application based on the compressed DSM, and generating at least one compressed partition matrix based on the tagged and levelled modules. The method further includes generating at least one expanded partition matrix based on the at least one compressed partition matrix, generating value threads using the at least one compressed partition matrix and obtaining a new scheduling table and performing a path analysis using the value threads to determine the efficient software testing scheme.

15 Claims, 6 Drawing Sheets

(56) References Cited

OTHER PUBLICATIONS

Ljubmir Lzic et al., "Cost Effective Software Test Metrics" [Online], 2008, pp. 599-619, [Retrieved from Internet on Sep. 21, 2013], <http://www.wseas.us/e-library/transactions/computers/2008/27-248.pdf>.*

Browning, T., "Applying the Design Structure Matrix to System Decomposition and Integration Problems: A Review and New Directions," IEEE Transactions on Engineering Management, 44(3):292-306 (2001).

Mao et al., "Using Dependence Matrix to Support Change Impact Analysis for CBS," IEEE Computer Society, Fifth International Conference on Computational Science and Applications, pp. 192-197 (2007).

Sangal et al., "Using Dependency Models to Manage Complex Software Architecture," OOPSLA '05, Oct. 16-20, 2005, San Diego, CA.

Shaja et al., "Management of Dependencies of Analyses in Multidisciplinary Aerospace Systems," pp. 1-10 (Date Unknown)Center for Aerospace Systems Design and Engineering, Aerospace Engineering Department Indian Institute of Technology Bombay, Mumbai—400076, India, pp. 1-10 (2005).

Vieira et al., "Analyzing Dependencies in Large Component-Based Systems," Proceedings of the 17th IEEE International Conference on Automated Software Engineering (ASE '02) 8 pp. (2002).

* cited by examiner

COMPLEXITY DEPENDENCY CHANGE IMPACT SYSTEM AND METHOD

FIELD OF TECHNOLOGY

Embodiments of the present invention relate to the field of testing of computer software. More particularly, embodiments of the present invention relate to a system and method for determining an efficient software testing scheme based on a dependency structure matrix (DSM) analysis.

BACKGROUND

Software products may consist of multiple components/modules. In a software product testing scenario, the software product having multiple components/modules may progress through a testing lifecycle and encounter different challenges at different phases.

The challenges include, for example, finding an efficient, streamlined, and accurate way to test the software product. Simple end-to-end testing, i.e., testing the modules sequentially from first module to last module, may produce accurate results but typically may be inefficient and, therefore, costly. Streamlining the testing, however, may raise issues such as determining what order or sequence the modules of a system should be taken up for execution for optimal efficiency; determining which of the components/modules can be executed in parallel for optimal efficiency; determining which components/modules may have to be kept under a single team or coupled strongly in terms of communication flow to provide accurate testing results; and determining all the end-to-end scenarios/flows in the system that have to be tested to generate efficient and accurate test results.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follow.

DETAILED DESCRIPTION

A complexity dependency change impact system and method is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
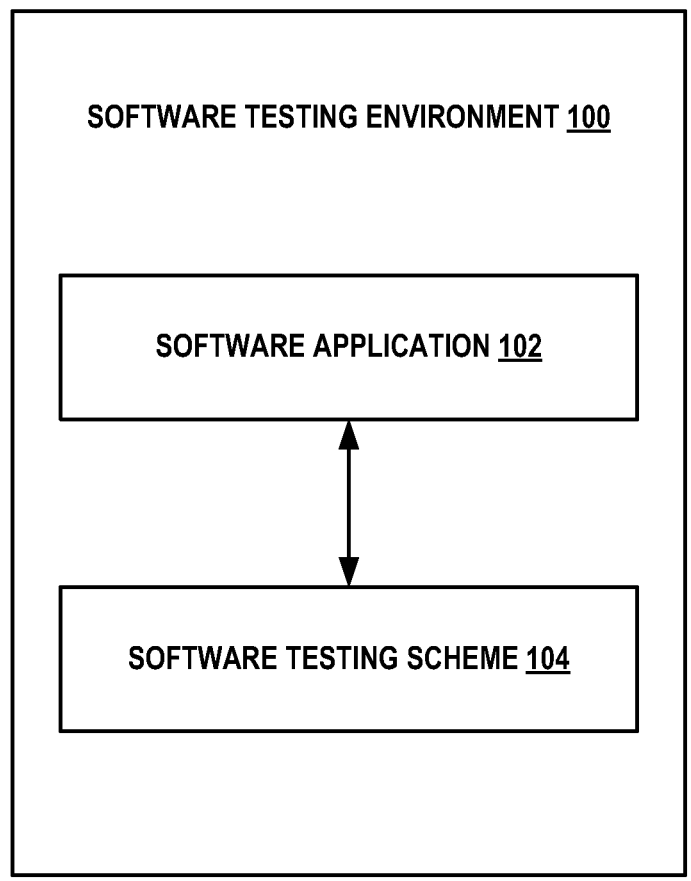
FIG. 1 illustrates a block diagram of a software testing environment, according to one embodiment.

FIG. 1 illustrates a block diagram of a software testing environment 100, according to one embodiment. Particularly, FIG. 1 illustrates a software application 102 and a software testing scheme 104. The software application 102 refers to a computer program, procedure and/or documentation that perform some tasks on a data processing system (e.g., a computer system). The software application 102 includes several modules that need to be quality tested with respect to a context in which the software application 102 is intended to operate.

The software testing scheme 104 analyses interdependency among all the modules of the software application 102 and segregates the modules into different levels of hierarchy based on a dependency structure matrix (DSM) analysis. In one exemplary implementation, the modules in level 1 are executed first, and then the modules in level 2 and so on, during a process of test execution. In another exemplary implementation, the modules of the software application 102 belonging to a same level can be executed in parallel as the modules are not interdependent.

Figure 2:
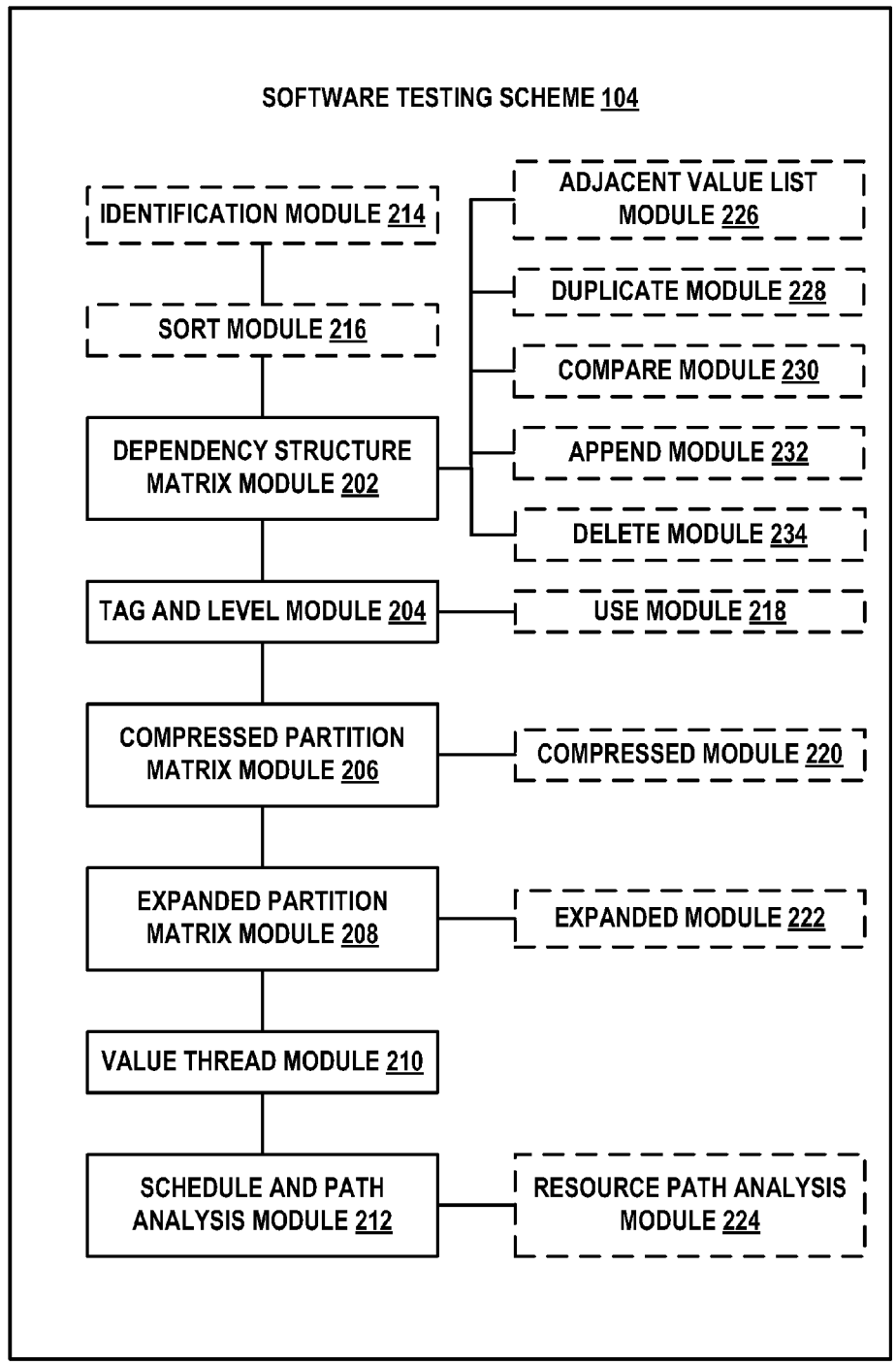
FIG. 2 illustrates various modules associated with the software testing scheme of FIG. 1, according to one embodiment.

FIG. 2 illustrates various modules associated with the software testing scheme 104 of FIG. 1, according to one embodiment. Particularly, FIG. 2 illustrates a dependency structure matrix module 202, a tag and level module 204, a compressed partition matrix module 206, an expanded partition matrix module 208, a value thread module 210, a schedule and path analysis module 212, an identification module 214 and a sort module 216.

In operation, the dependency structure matrix module 202 generates a compressed DSM based on cyclic blocks associated with the modules of the software application 102. As shown in FIG. 2, the dependency structure matrix module 202 includes an adjacent value list module 226, a duplicate module 228, a compare module 230, an append module 232 and a delete module 234. In one embodiment, the adjacent value list module 226 generates an adjacent value list and stores the adjacent value list as a first array. The duplicate module 228 then duplicates the first array as a second array. The compare module 230 compares, for each individual number in a cyclic block in the first array, the individual number to an adjacent number in the cyclic block. The append module 232 appends the second array with the individual number of the first array if the comparison is not equal. The delete module 234 deletes the individual number from the second array.

Further, the tag and level module 204 tags and levels the modules of the software application 102 based on the compressed DSM. Levelling is a layering process. All the modules in the software application 102 are arranged according to a hierarchy to which it belongs. For example, if a module C is dependent on a module B and the module B is dependent on a module A, then the module A will be in a first level, the module B in a second level and the module C in a third level. If there is another module D, which is isolated (not dependent on modules A, B and C), then the module D can be put in any of the levels (first level or second level or third level).

As shown in FIG. 2, the tag and level module 204 includes a use module 218. In one embodiment, the use module 218 uses an As Early As Possible (AEAP) tagging algorithm, an AEAP leveling algorithm, an As Late As Possible (ALAP) tagging algorithm and an ALAP levelling algorithm for tagging and levelling the modules of the software application 102. Exemplary pseudo-code describing the AEAP tagging algorithm, the AEAP levelling algorithm, the ALAP tagging algorithm and the ALAP levelling algorithm is illustrated in APPENDIX B, APPENDIX C, APPENDIX D and APPENDIX E, respectively.

The compressed partition matrix module 206 generates a compressed partition matrix based on the tagged and levelled modules. As shown in FIG. 2, the compressed partition matrix module 206 includes a compressed module 220. In one embodiment, the compressed module 220 generates a compressed AEAP partition matrix and a compressed ALAP partition matrix. The expanded partition matrix module 208 generates an expanded partition matrix based on the compressed partition matrix. As shown in FIG. 2, the expanded partition matrix 208 includes an expanded module 222. In one embodiment, the expanded module 222 generates an expanded AEAP partition matrix and an expanded ALAP partition matrix. Further, the value thread module 210 generates value threads using the compressed partition matrix. An exemplary pseudo-code describing a value thread algorithm for generating the value threads is illustrated in APPENDIX F.

Furthermore, the schedule and path analysis module 212 obtains a new scheduling table and performs a path analysis using the value threads to determine the software testing scheme 104. For example, the path analysis is performed using the obtained schedule information associated with each module of the software application 102 (or execution time of each module) from the new scheduling table. The path analysis gives a total execution time of each value thread, critical paths and earliest possible and latest possible starting or completion time for each module according to project timelines. As shown in FIG. 2, the schedule and path analysis module 212 includes a resource path analysis module 224. In one embodiment, the resource path analysis module 224 performs a limited resource path analysis and an unlimited resource path analysis. The identification module 214 identifies the cyclic blocks associated with the modules of the software application 102. The sort module 216 sorts the identified cyclic blocks associated with the modules of the software application 102. An exemplary pseudo-code describing a sorting algorithm for sorting the identified cyclic blocks in a traversal order is illustrated in APPENDIX A.

Figure 3:
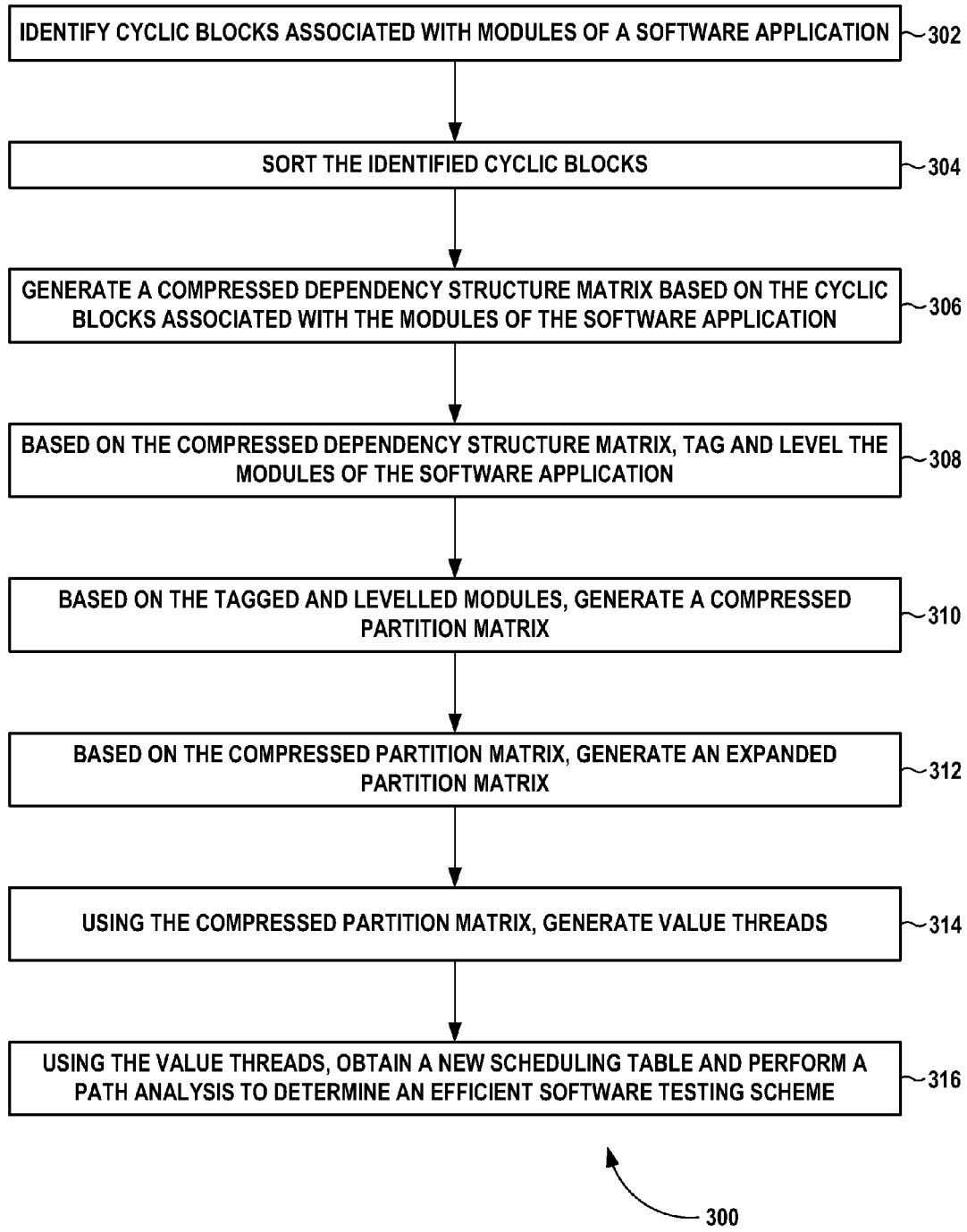
FIG. 3 illustrates a process flowchart of an exemplary method of determining an efficient software testing scheme based on a dependency structure matrix (DSM) analysis, according to one embodiment.

FIG. 3 illustrates a process flowchart 300 of an exemplary method of determining an efficient software testing scheme (e.g., the software testing scheme 104 of FIG. 1) based on a DSM analysis, according to one embodiment. In operation 302, cyclic blocks associated with modules of a software application (e.g., the software application 102 of FIG. 1) are identified. In operation 304, the identified cyclic blocks are sorted. In operation 306, a compressed DSM is generated based on the cyclic blocks associated with the modules of the software application 102.

In some embodiments, generating the compressed DSM based on the cyclic blocks associated with the modules of the software application 102 includes generating an adjacent value list and storing the adjacent value list as a first array, duplicating the first array as a second array, comparing, for each individual number in a cyclic block in the first array, the individual number to an adjacent number in the cyclic block, appending the second array with the individual number of the first array if the comparison is not equal and deleting the individual number from the second array.

In operation 308, the modules of the software application 102 are tagged and levelled based on the compressed DSM. In some embodiments, tagging and levelling the modules of the software application 102 based on the compressed DSM includes using an AEAP tagging algorithm, an AEAP levelling algorithm, an ALAP tagging algorithm, and an ALAP levelling algorithm.

In operation 310, a compressed partition matrix is generated based on the tagged and levelled modules. In some embodiments, generating the compressed partition matrix includes generating at least one of a compressed AEAP partition matrix and a compressed ALAP partition matrix. In operation 312, an expanded partition matrix is generated based on the compressed partition matrix. In some embodiments, generating the expanded partition matrix includes generating at least one of an expanded AEAP partition matrix and an expanded ALAP partition matrix.

In operation 314, value threads are generated using the compressed partition matrix. In operation 316, a new scheduling table is obtained and a path analysis is performed using the value threads to determine the efficient software testing scheme 104. In some embodiments, obtaining the new scheduling table and performing the path analysis using the value threads includes performing at least one of a limited resource path analysis and an unlimited resource path analysis.

Figure 4:
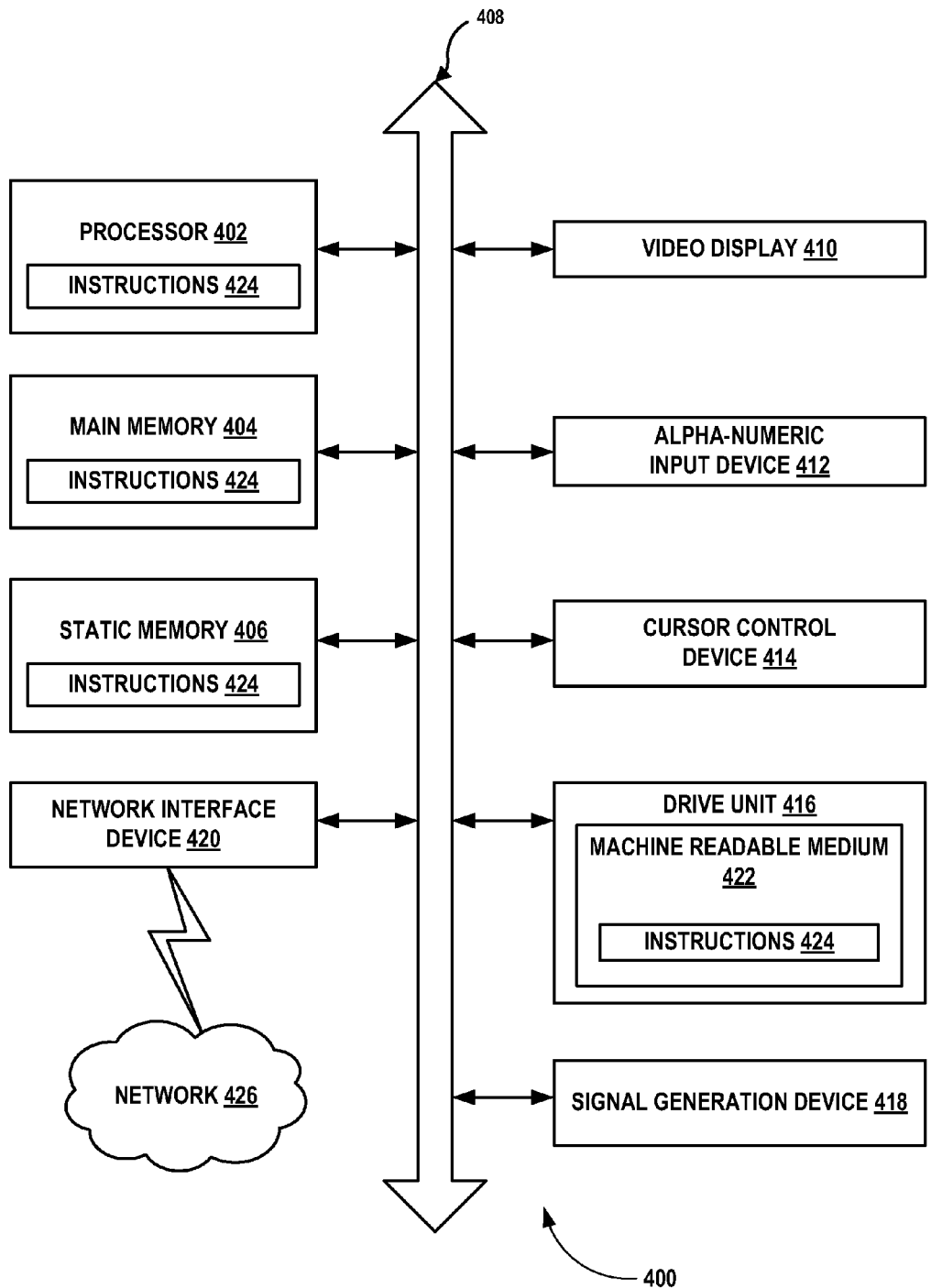
FIG. 4 illustrates a diagrammatic system view of a data processing system in which any of the embodiments disclosed herein may be performed, according to one embodiment.

FIG. 4 illustrates a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of a method of determining an efficient software testing scheme (e.g., the software testing scheme 104 of FIG. 1) based on a DSM analysis, the method includes generating a compressed DSM based on cyclic blocks associated with modules of a software application (e.g., the software application 102 of FIG. 1), tagging and levelling the modules of the software application 102 based on the compressed DSM, and generating a compressed partition matrix based on the tagged and levelled modules.

In one embodiment, generating the compressed DSM based on the cyclic blocks associated with the modules of the software application 102 includes generating an adjacent value list and storing the adjacent value list as a first array, duplicating the first array as a second array, comparing, for each individual number in a cyclic block in the first array, the individual number to an adjacent number in the cyclic block, if the comparison is not equal, appending the second array with the individual number of the first array, and deleting the individual number from the second array.

In another embodiment, tagging and levelling the modules of the software application 102 includes using an AEAP tagging algorithm, an AEAP levelling algorithm, an ALAP tagging algorithm and an ALAP levelling algorithm. In yet another embodiment, generating the compressed partition matrix includes generating at least one of a compressed AEAP partition matrix and a compressed ALAP partition matrix.

Further, the storage medium has instructions to generate an expanded partition matrix based on the compressed partition matrix, generate value threads using the compressed partition matrix and obtain a new scheduling table and perform a path analysis using the value threads to determine the efficient software testing scheme 104. In addition, the storage medium may have instructions to identify the cyclic blocks associated with the modules of the software application 102 and to sort the identified cyclic blocks.

Further, in accordance with the above described embodiments, the steps involved in determining the efficient software testing scheme 104 based on the DSM analysis is described in greater detail as follows.

1. Identify Cyclic Blocks Associated with Modules of a Software Application.

Figure 5A:
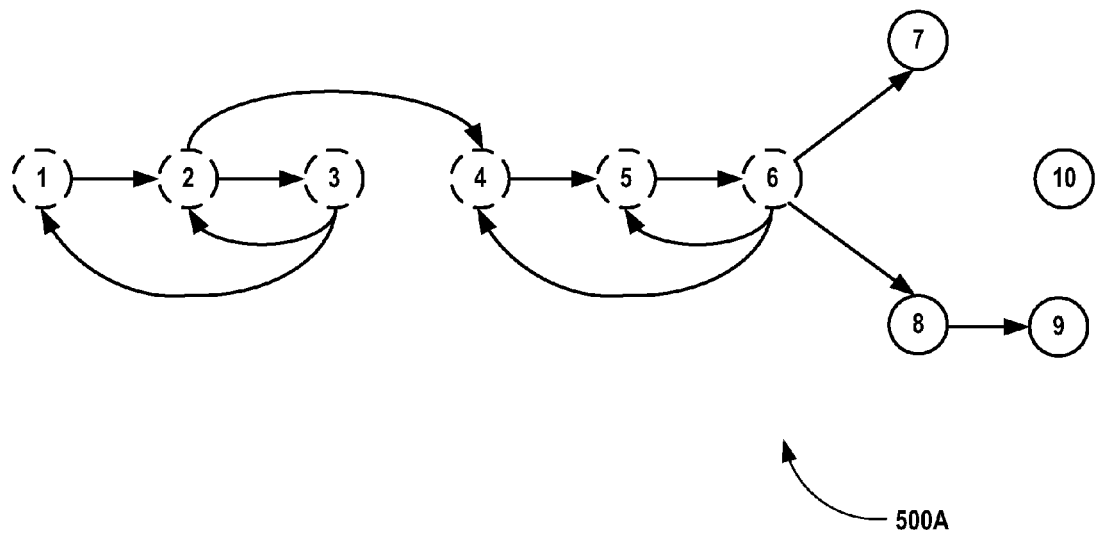
FIGS. 5A and 5B illustrate exemplary cyclic blocks associated with modules of a software application.
Figure 5B:
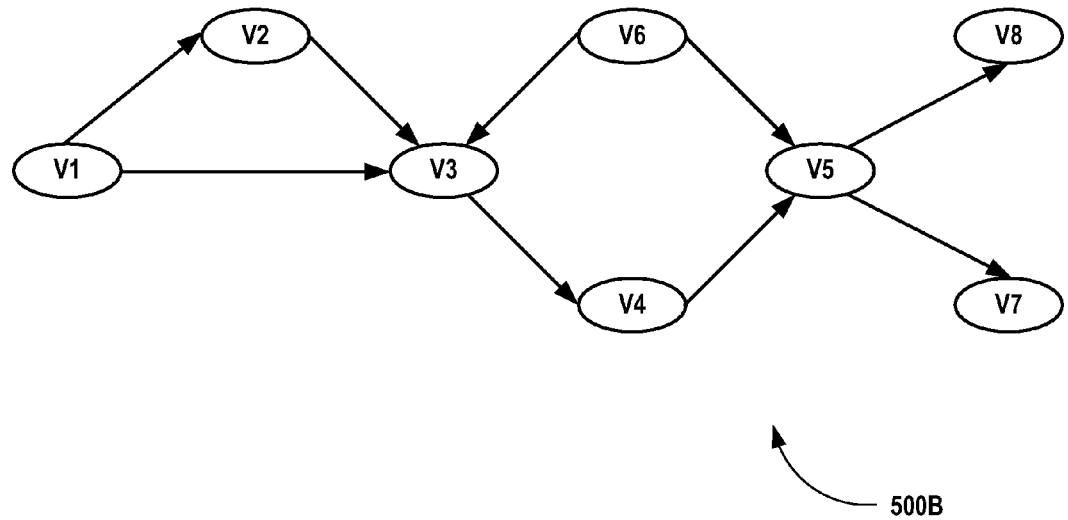

Consider a software application (e.g., the software application 102 of FIG. 1) including modules. For example, FIG. 5A shows a flow diagram including blocks 1, 2, 3, 4, 5, 6, 7, 8, 9 and 10 and FIG. 5B shows another flow diagram including blocks V1, V2, V3, V4, V5, V6, V7, and V8. It should be noted that the modules of the software application 102 correspond to the blocks in the flow diagrams of FIG. 5A and FIG. 5B, respectively. The flow diagrams of FIG. 5A and FIG. 5B are typical examples of cyclic blocks. Given any flow diagram, it is always possible to represent the flow diagram in the form of a DSM and vice versa.

In FIG. 5A, the modules 1, 2 and 3 are cyclically dependent on each other. Also, the modules 2 and 3 are cyclically dependent on each other. In such a case, the modules 1, 2 and 3 are together considered as a cyclic block. Similarly, the modules 4, 5 and 6 are considered as another cyclic block. But, the modules 7, 8, 9 and 10 are not part of any cyclic block. In FIG. 5B, the modules (V1, V2, V3) and the modules (V3, V4, V5, V6) are two cycles touching each other at the module V3. Thus, the modules (V1, V2, V3, V4, V5, V6) are together considered as one cyclic block. But, the modules V7 and V8 are not part of this cyclic block.

It is appreciated that the software testing scheme 104 employs an algorithm to segregate the modules that form a cyclic block. At first, cycles associated with the modules are identified and then the corresponding modules are grouped together. The following are the steps involved in identifying the cycles and grouping the corresponding modules together.

a) Starting from a DSM, compute a matrix A such that A[i,j] =1, if there is a path of length one or more from i to j, and 0 otherwise. A is called the transitive closure of the DSM. For a DSM or order n×n (n rows and n columns or n modules), the transitive closure is found in n iterations, using Warshall's algorithm, which is outlined below.

Let $A_0 = C$. The following formula is used in the $k^{th}$ iteration:

$$A_k[i,j] = A_{k-1}[i,j] \text{ or } (A_{k-1}[i,k] \text{ and } A_{k-1}[k,j])$$

This formula states that there is a path from i to j not passing through a module numbered higher than k if There is already a path from i to j not passing through a module numbered higher than k−1 or There is a path from i to k not passing through a module numbered higher than k−1 and a path from k to j not passing through a module numbered higher than k−1.

Figure 6A:
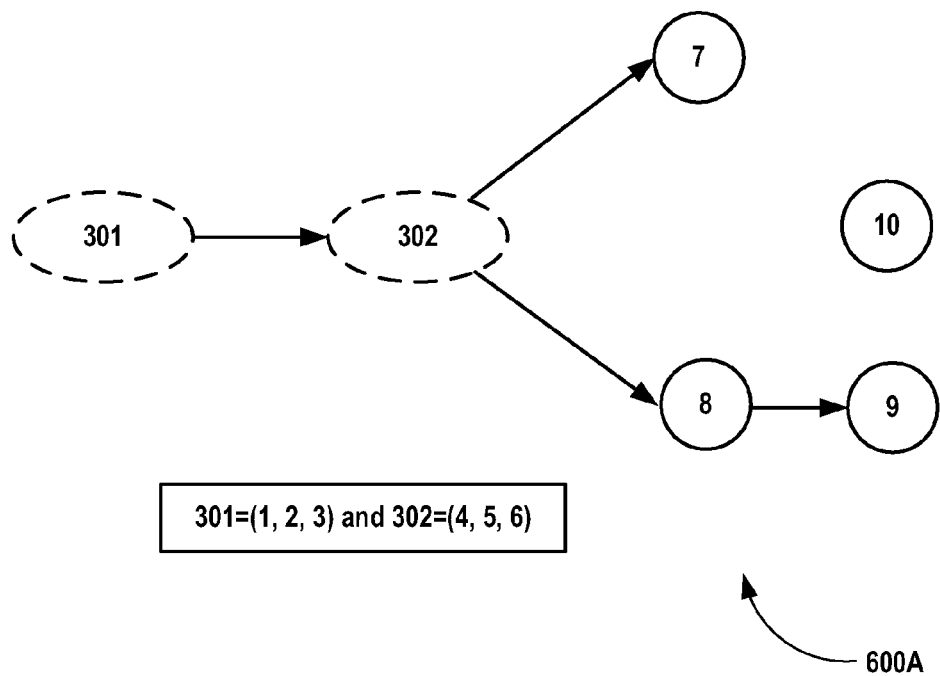
FIGS. 6A and 6B illustrate exemplary compressed flow diagrams associated with the modules of the software application.
Figure 6B:
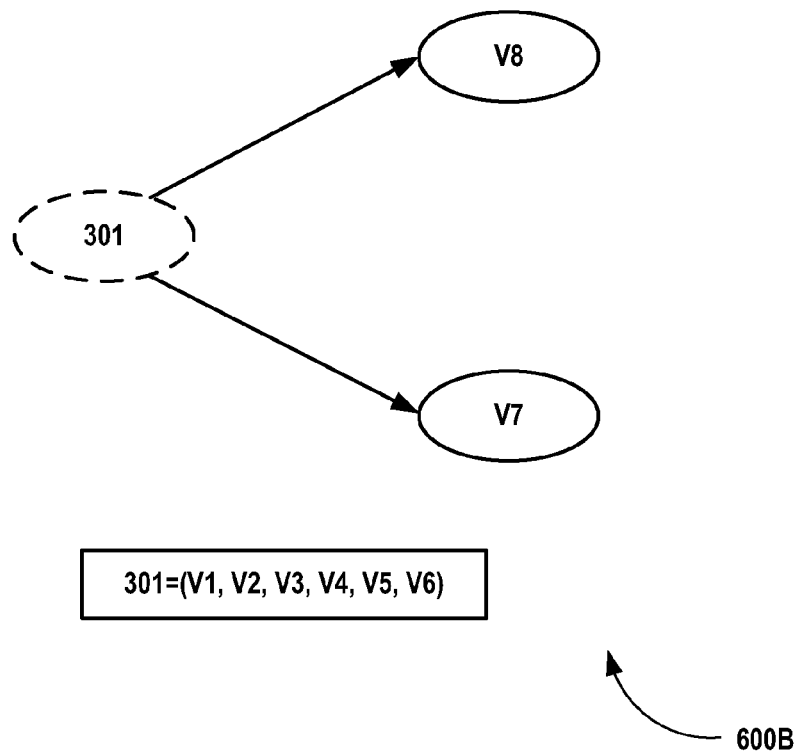

Finally, after the nth iteration, consider $A = A_n$, which is the transitive closure for the given DSM. It should be noted that a path that exists from a module to itself is not considered. Thus, all the diagonal elements of A are set to zero i.e., A[i,i]=0 for i from 1 to n.

b) In the transitive closure A, for any two modules i, j, if A[i,j]=1 and A[j,i]=1. From above, it can be inferred that i and j are part of a cycle. Store all such pairs [i,j] for which there exists a path from i to j and backwards and denote this array by CL. As mentioned above, the principal diagonal elements of A are zero. Hence, the pairs [i,i] should not be stored.

c) Starting from the first member of CL, go through all the remaining members of CL. If a next pair, say (u, v), has a component common with that of the first pair, then take union of these two pairs. For example, name this array as CL1, which now has three members. Repeat the same procedure for all the members of CL. This gives a list of the members of the DSM, which are the members of the cycle. After saving this array, a fresh array is initiated till all the members of CL are exhausted. Therefore, the third step provides with groups of modules which form cycles. For example, with all the groups of cyclic blocks in the software application 102 identified, FIG. 5A and FIG. 5B have compressed flow diagrams without cyclic blocks as shown in FIG. 6A and FIG. 6B.

2. Sort the Identified Cyclic Blocks Associated with the Modules of the Software Application 102.

The identified cyclic blocks have to be arranged according to the traversal order. For example, consider the cyclic block 301 in FIG. 5A. (1, 2, 3), (2, 3, 1) are two of the several traversal orders. But, (1, 3, 2) is not a traversal order. An exemplary pseudo-code describing a sorting algorithm for sorting the identified cyclic blocks in a traversal order is illustrated in APPENDIX A.

3. Generate a Compressed DSM Based on the Cyclic Blocks Associated with the Modules of the Software Application 102.

For a given software application 102, we have the input DSM as shown in Table 1 and a list of all the cyclic blocks present in the software application 102.

TABLE 1

| MODULE | 1 | 2 | 3 | 4 | 5 | 6 | 7 | 8 | 9 | 10 |
|---|---|---|---|---|---|---|---|---|---|---|
| 1 | 1 |  | 1 |  |  |  |  |  |  |  |
| 2 | 1 | 1 | 1 |  |  |  |  |  |  |  |
| 3 |  | 1 | 1 |  |  |  |  |  |  |  |
| 4 |  | 1 |  | 1 |  | 1 |  |  |  |  |
| 5 |  |  |  |  | 1 | 1 | 1 |  |  |  |
| 6 |  |  |  |  | 1 | 1 |  |  |  |  |
| 7 |  |  |  |  |  | 1 | 1 |  |  |  |
| 8 |  |  |  |  |  | 1 |  | 1 |  |  |
| 9 |  |  |  |  |  |  |  | 1 | 1 |  |
| 10 |  |  |  |  |  |  |  |  |  | 1 |

Using these two, the compressed DSM (Table 2) is generated. In other words, a DSM without any cyclic blocks is generated (as shown in Table 2). The following are the steps involved in generating the compressed DSM as shown in Table 2.

1) Generate an adjacent value list and store the adjacent value list as a first array (L).
2) Duplicate the first array (L) as a second array (LL).
3) For each individual number in a cyclic block (e.g., 301) in the first array (L), compare the individual number to an adjacent number in the cyclic block 301.
4) If the comparison is equal, ignore the value.
5) If the comparison is not equal, append the second array (LL) with the individual number of the first array (L).
6) Delete the individual number of the cyclic block 301 from the second array (LL).
7) Repeat the above steps for all cyclic blocks.

For example, in Table 1, L(1)={3}, L(2)={1, 3}, L(3)={2}, L(4)={2, 6}, L(5)={4, 6} and L(6)={5}. 301=(1, 2, 3). Then L(301)={ }, since the members of L(1), L(2) and L(3) are all in 301. Similarly L(302)={2}={301} (Since, the module 2 is in the cyclic block 301).

TABLE 2

| MODULE | 301 | 302 | 7 | 8 | 9 | 10 |
|---|---|---|---|---|---|---|
| 301 | 1 |  |  |  |  |  |
| 302 | 1 | 1 |  |  |  |  |
| 7 |  | 1 | 1 |  |  |  |
| 8 |  | 1 |  | 1 |  |  |
| 9 |  |  |  | 1 | 1 |  |
| 10 |  |  |  |  |  | 1 |

It is appreciated that the compressed DSM of Table 2 is generated based on the input DSM of Table 1 and the list of the cyclic blocks present in the software application 102.

4. Tag and Level the Modules of the Software Application 102 Based on the Compressed DSM. (e.g., Table 2)

a) Tag the modules of the software application 102 using the AEAP tagging algorithm An exemplary pseudo-code describing the AEAP tagging algorithm is illustrated in APPENDIX B. The modules in the compressed DSM of Table 2 are tagged using the AEAP tagging algorithm as follows:

ML(301)=1
ML(302)=2
ML(7)=3
ML(8)=3
ML(9)=4
ML(10)=1 b) Level the modules of the software application 102 using the AEAP levelling algorithm An exemplary pseudo-code describing the AEAP levelling algorithm is illustrated in APPENDIX C. The modules in the compressed DSM of Table 2 are levelled using the AEAP levelling algorithm as follows:

LM(1,1)=301
LM(1,2)=10
LM(2,1)=302
LM(3,1)=7
LM(3,2)=8
LM(4,1)=9

For example, an AEAP levelling table showing an arrangement of the modules of the compressed DSM of Table 2 with respect to the levels is given below in Table 3;

TABLE 3

| Levels | Modules | |
|---|---|---|
| 1 | 301 | 10 |
| 2 | 302 |  |
| 3 | 7 | 8 |
| 4 | 9 |  |

In the above-described AEAP tagging and levelling technique, the modules of the software application 102 are arranged in such a way that each of these modules can be taken up for execution at the earliest possible time line in the actual project scenario. As seen from the above example, the module 10 is independent (or isolated) and can be tagged to any level. In this case, it is put in the first level.

c) Tag the modules of the software application 102 using the ALAP tagging algorithm An exemplary pseudo-code describing the ALAP tagging algorithm is illustrated in APPENDIX D. The modules in the compressed DSM of Table 2 are tagged using the ALAP tagging algorithm as follows:

ML(301)=1
ML(302)=2
ML(8)=3
ML(7)=4
ML(9)=4
ML(10)=4 d) Level the modules of the software application 102 using the ALAP levelling algorithm An exemplary pseudo-code of the ALAP levelling algorithm is illustrated in APPENDIX E. The modules in the compressed DSM of Table 2 are levelled using the ALAP levelling algorithm as follows:

LM(1,1)=301
LM(2,1)=302
LM(3,1)=8
LM(4,1)=7
LM(4,2)=9
LM(4,3)=10

For example, an ALAP levelling table showing an arrangement of the modules of the compressed DSM of Table 2 with respect to the levels is given below in Table 4;

TABLE 4

| Levels | Modules → | | |
|---|---|---|---|
| 1 | 301 | | |
| 2 | 302 | | |
| 3 | 8 | | |
| 4 | 7 | 9 | 10 |

In the above-described ALAP tagging and levelling technique, the modules of the software application 102 are arranged in such a way that each of these modules can be taken up for execution As Late As Possible in the time line in the actual project scenario. As seen from the above example, the module 10 is independent (or isolated) and is put in the last level.

5. Generate a Compressed AEAP Partition Matrix and a Compressed ALAP Partition Matrix.

The AEAP compressed partition matrix is a DSM with rows and columns arranged according to the AEAP levelling table. In other words, all the modules of the software application 102 are arranged according to the AEAP levelling table. The AEAP compressed partition matrix for Table 2 is given below in Table 5;

TABLE 5

| MODULE | 301 | 10 | 302 | 7 | 8 | 9 |
|---|---|---|---|---|---|---|
| 301 | 1 | | | | | |
| 10 | | 1 | | | | |
| 302 | 1 | | 1 | | | |
| 7 | | | | 1 | 1 | |
| 8 | | | | 1 | 1 | |
| 9 | | | | | 1 | 1 |

Similarly, in the ALAP compressed partition matrix, rows and columns of the DSM are arranged according to the ALAP levelling table. For example, the ALAP compressed partition matrix for Table 2 is given below in Table 6;

TABLE 6

| MODULE | 301 | 302 | 8 | 7 | 9 | 10 |
|---|---|---|---|---|---|---|
| 301 | 1 | | | | | |
| 302 | 1 | 1 | | | | |
| 8 | | 1 | 1 | | | |
| 7 | | 1 | | 1 | | |
| 9 | | | 1 | | 1 | |
| 10 | | | | | | 1 |

6. Generate an Expanded AEAP Partition Matrix and an Expanded ALAP Partition Matrix.

The AEAP and ALAP expanded partition matrices are similar to that of compressed matrices with all the cyclic blocks expanded. For example, the AEAP and ALAP expanded partition matrices generated based on the AEAP and ALAP compressed partition matrices are illustrated below in Table 7 and Table 8, respectively;

TABLE 7

| MODULE | 1 | 2 | 3 | 10 | 4 | 5 | 6 | 7 | 8 | 9 |
|---|---|---|---|---|---|---|---|---|---|---|
| 1 | 1 | | 1 | | | | | | | |
| 2 | 1 | 1 | 1 | | | | | | | |
| 3 | | 1 | 1 | | | | | | | |
| 10 | | | | 1 | | | | | | |
| 4 | | 1 | | | 1 | | 1 | | | |
| 5 | | | | | 1 | 1 | 1 | | | |
| 6 | | | | | | 1 | 1 | | | |
| 7 | | | | | | | 1 | 1 | | |
| 8 | | | | | | | 1 | | 1 | |
| 9 | | | | | | | | | 1 | 1 |

TABLE 8

| MODULE | 1 | 2 | 3 | 4 | 5 | 6 | 8 | 7 | 9 | 10 |
|---|---|---|---|---|---|---|---|---|---|---|
| 1 | 1 | | 1 | | | | | | | |
| 2 | 1 | 1 | 1 | | | | | | | |
| 3 | | 1 | 1 | | | | | | | |
| 4 | | 1 | | 1 | | 1 | | | | |
| 5 | | | | 1 | 1 | 1 | | | | |
| 6 | | | | | 1 | 1 | | | | |
| 7 | | | | | | 1 | 1 | | | |
| 8 | | | | | | 1 | | 1 | | |
| 9 | | | | | | | 1 | | 1 | |
| 10 | | | | | | | | | | 1 |

7. Generate Value Threads Using the at Least One Compressed Partition Matrix.

Value thread gives all the sequences of information flow from the first level to the last level in the given software application 102. The value threads are generated using on a value thread algorithm. An exemplary pseudo-code describing the value thread algorithm is illustrated in APPENDIX F. For the purpose of illustration, the AEAP compressed partition matrix is used for generating the value threads. For example, the value thread table for Table 2 is given below in Table 9;

TABLE 9

| Sl. No. | Thread → | | | |
|---|---|---|---|---|
| 1 | 301 | 302 | 8 | 9 |
| 2 | 301 | 302 | 7 | |
| 3 | 10 | | | |

8. Obtain a New Scheduling Table and Perform a Path Analysis Using the Value Threads.

Table 10 shows a scheduling table including scheduling information associated with the modules of the software application 102.

TABLE 10

| SCHEDULE | MODULE NO. | 1 | 2 | 3 | 4 | 5 | 6 | 7 | 8 | 9 | 10 |
|---|---|---|---|---|---|---|---|---|---|---|---|
| 5 | 1 | 1 |  | 1 |  |  |  |  |  |  |  |
| 5 | 2 | 1 | 1 | 1 |  |  |  |  |  |  |  |
| 10 | 3 |  | 1 | 1 |  |  |  |  |  |  |  |
| 2 | 4 |  |  | 1 | 1 |  | 1 |  |  |  |  |
| 3 | 5 |  |  |  |  | 1 | 1 | 1 |  |  |  |
| 5 | 6 |  |  |  |  |  | 1 | 1 |  |  |  |
| 25 | 7 |  |  |  |  |  | 1 | 1 |  |  |  |
| 5 | 8 |  |  |  |  |  | 1 |  | 1 |  |  |
| 10 | 9 |  |  |  |  |  |  |  | 1 | 1 |  |
| 20 | 10 |  |  |  |  |  |  |  |  |  | 1 |

The scheduling information is used to perform the path analysis. In one embodiment, the path analysis gives a table (value thread with schedule info) as shown in Table 11, where each module in the value thread table (shown in Table 9) is replaced with the execution time of each module of the software application 102. Table 11 gives the total time required for testing each sequence given by the value thread table. Table 11 also identifies critical path(s), i.e., the sequence(s) of the modules which require maximum time for completion.

TABLE 11

| THREADS |  |  |  |  | TOTAL TIME |  |
|---|---|---|---|---|---|---|
| 1 | 20 | 10 | 25 |  | 55 | CRITICAL PATH |
| 2 | 20 | 10 | 5 | 10 | 45 |  |
| 3 | 20 |  |  |  | 20 |  |

It is appreciated that the software testing scheme 104 gives two different path analyses, viz., a PA1 output shown in Table 12 and a PA2 output shown in Table 13. The PA1 output is associated with a limited resource path analysis and the PA2 output is associated with an unlimited resource path analysis. In PA1, the execution time of a cyclic block is the sum of the execution times of the modules in that cyclic block. In PA2, the execution time of a cyclic block is the maximum of all the execution times of the modules in that cyclic block.

TABLE 12

| MODULE NO. | SCHEDULE |
|---|---|
| 10 | 20 |
| 9 | 10 |
| 8 | 5 |
| 7 | 25 |
| 302 | 10 |
| 301 | 20 |

TABLE 13

| MODULE NO. | SCHEDULE |
|---|---|
| 10 | 20 |
| 9 | 10 |
| 8 | 5 |
| 7 | 25 |
| 302 | 5 |
| 301 | 10 |

Furthermore, Table 14 shows a float analysis table which gives an early start time, late start time, early finish time and late finish time for each module in the software application 102 according to the project timeline.

TABLE 14

| MODULE NO. | ES | LS | EF | LF | F |
|---|---|---|---|---|---|
| 10 | 0 | 35 | 20 | 55 | 35 |
| 9 | 35 | 45 | 45 | 55 | 10 |
| 8 | 30 | 40 | 35 | 45 | 10 |
| 7 | 30 | 30 | 55 | 55 | 0 |
| 302 | 20 | 20 | 30 | 30 | 0 |
| 301 | 0 | 0 | 20 | 20 | 0 |

The above-described software testing scheme generates four main outputs viz., As Early As Possible sequencing, As Late As Possible sequencing, value thread and reports. Thus, by giving one input, all the possible type of sequencing can be obtained in one go. Also, the value thread output is very vital from a planning perspective. Further, the speed with which the software testing tool analyses a software application as a whole and generates an output helps in reducing the total time and effort required across the product testing phase. The capability to scale up to 200 components and/or modules in a single trial makes the above-described software testing scheme even more useful and handy in complex products and/or applications. Moreover, in the above-described method and system, the hierarchical segregation and sequencing of modules is more intuitive. Also, the above-mentioned software testing scheme is user friendly in terms of providing inputs and obtaining the outputs. The outputs can be obtained in MS Excel, HTML or CSV as per the requirements.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

APPENDIX A a) Take a cyclic block.
b) Take modules in the cyclic block.
c) Create a matrix using the modules. Put Is as per the dependency list. Avoid those pairs where other modules (than in the cyclic block under consideration) are involved.
d) Find a row sum for all modules. This is a RL count for the modules.
e) Start with the module (say A) which is having the highest RL-count. If more than one module with the highest RL count exists, choose any one. The module A will be the first member in the stack.
f) Select a next member in the stack with the adjacency value of this module (say P), where P is a member of the cyclic block under consideration.
g) If there are more than 1 Ps,
  i) Select the module which is having the minimum RL-count and which is not appearing in the upper portion of the stack.
  ii) If more than one such module exists, then choose any one.
h) If module P is not available,
  i) Select the module (say Q) from the remaining modules which is having the minimum RL count. If more than one module Q exists, then choose any one module Q. Add the module Q to the stack.
  ii) If the adjacency value of the module Q is already present in the stack, avoid selection of this module Q and skip to another available module Q.
  iii) If only one module Q is available for consideration, add the module Q to the stack and go to step j.
i) Go to step f.
j) Cut the module A from top of the stack and append the module A at the end of the stack.
k) Sort the stack according to the RL-count in an ascending order. This is the traversal order which is required within the cyclic block.

APPENDIX B

Input:
MD a*a matrix
MDT a*a matrix, a temporary matrix
Output:
ML a*1 matrix
MDT = MD
For i = 1 to a ML(i) = 0
For k = 1 to a
    For i = 1 to a
        {If ML(i) = 0
        Sum =0
        For j = 1 to a sum = sum + MDT(i,j)
        If sum = 0 ML(i) = k
        }
    For j = 1 to a
        {If ML(j) <> 0
        For i = 1 to a MDT(i,j) = 0
        }
b = max(ML(i)); finding no. of levels

APPENDIX C

For j = 1 to b
    For i = 1 to a
        k = 1

APPENDIX C-continued

If ML(i) = j
            LM(j,k) = i
            k = k+1

APPENDIX D

Input:
MD a*a matrix
MDT = MD
For i = 1 to a ML(i) = 0
For k = 1 to a
    For j = 1 to a
        {If ML(j) = 0
            {Sum = 0
            For i = 1 to a sum = sum + MDT(i,j)
            If sum = 0 ML(j) = k
            }
        }
    For i = 1 to a
        If ML(i) <> 0
            For j = 1 to a MDT(i,j) = 0
b = Max(ML(i)) ; find the no. of levels
For i = 1 to a
    ML(i) = b+1 − ML(i)

APPENDIX E

For j = 1 to b
    For i = 1 to a
        k = 1
        If ML(i) = j
            LM(j,k) = i
            k = k+1

APPENDIX F

Take rows one by one upto $N^{th}$ row
    If y(row) = x(row)
        If count1[y] >1
            Append destination row to array
        Append x to destination row
        Count2[y] = count2[y]−1
        Re-calculate count1 and count2
        If count2[y]<1, delete source row
    Re-calculate count1 and count2
    a = product of [count1 of modules other than in level 1] −1
    N+a−1
    b = Number of levels

What is claimed is:

1. A method for determining an efficient testing scheme, comprising:
    analyzing, with a data processing system, a computer program, the analyzing comprising identifying a plurality of modules together comprising at least a portion of the computer program, identifying one or more dependencies of one or more of the modules, and determining one or more cyclic blocks including one or more of the modules based on the dependencies;
    obtaining, with the data processing system, an execution time for each of the modules and determining at least one execution time for each of the cyclic blocks based on the execution times for each of the modules included in each of the cyclic blocks;
    sorting, with the data processing system, the identified cyclic blocks in a traversal order prior to generating a compressed dependency structure matrix;

generating, with the data processing system, the compressed dependency structure matrix based on the cyclic blocks and the dependencies, at least one leveling table based on the compressed dependency structure matrix, and at least one compressed partition matrix based on the at least one leveling table and the dependencies;

identifying, with the data processing system, one or more value threads based on the at least one compressed partition matrix;

generating, with the data processing system, timing information for the computer program based on the identified one or more value threads and the obtained and determined execution times; and outputting, with the data processing system, the generated timing information for the computer program.

2. The method of claim 1, wherein the generating at least one leveling table further comprises:
applying at least one of an As Early As Possible tagging algorithm, an As Early As Possible leveling algorithm, an As Late As Possible tagging algorithm, or an As Late As Possible leveling algorithm.

3. The method of claim 1, wherein the generating at least one compressed partition matrix comprises:
generating at least one of a compressed As Early As Possible partition matrix or a compressed As Late As Possible partition matrix.

4. The method of claim 1, wherein the timing information comprises a total execution time for each of the value threads, an early start time for one or more of the modules or cyclic blocks, a late start time for one or more of the modules or cyclic blocks, an early finish time for one or more of the modules or cyclic blocks, a late finish time for one or more of the modules or cyclic blocks.

5. The method of claim 1, wherein the generating the timing information further comprises:
performing at least one of a limited resource path analysis or an unlimited resource path analysis.

6. A data processing system, comprising:
a processor; and
memory coupled to the processor and configured to store instructions that, when executed by the processor, cause the processor to perform steps comprising:
analyzing a computer program, the analyzing comprising identifying a plurality of modules together comprising at least a portion of the computer program, identifying one or more dependencies of one or more of the modules, and determining one or more cyclic blocks including one or more of the modules based on the dependencies;
obtaining an execution time for each of the modules and determining at least one execution time for each of the cyclic blocks based on the execution times for each of the modules included in each of the cyclic blocks;
sorting the identified cyclic blocks in a traversal order prior to generating a compressed dependency structure matrix;
generating the compressed dependency structure matrix based on the cyclic blocks and the dependencies, at least one leveling table based on the compressed dependency structure matrix, and at least one compressed partition matrix based on the at least one leveling table and the dependencies;
identifying one or more value threads based on the at least one compressed partition matrix;
generating timing information for the computer program based on the identified one or more value threads and the obtained and determined execution times; and
outputting the generated timing information for the computer program.

7. The system of claim 6, wherein the generating at least one leveling table further comprises applying at least one of an As Early As Possible tagging algorithm, an As Early As Possible leveling algorithm, an As Late As Possible tagging algorithm, or an As Late As Possible leveling algorithm.

8. The system of claim 6, wherein the generating at least one compressed partition matrix further comprises generating at least one of a compressed As Early As Possible partition matrix or a compressed As Late As Possible partition matrix.

9. The system of claim 6, wherein the timing information comprises a total execution time for each of the value threads, an early start time for one or more of the modules or cyclic blocks, a late start time for one or more of the modules or cyclic blocks, an early finish time for one or more of the modules or cyclic blocks, a late finish time for one or more of the modules or cyclic blocks.

10. The system of claim 6, wherein the generating the timing information further comprises performing at least one of a limited resource path analysis or an unlimited resource path analysis.

11. A non-transitory computer readable medium having stored thereon instructions for determining an efficient testing scheme comprising executable code that, when executed by a computer, causes the computer to perform steps comprising:
analyzing a computer program, the analyzing comprising identifying a plurality of modules together comprising at least a portion of the computer program, identifying one or more dependencies of one or more of the modules, and determining one or more cyclic blocks including one or more of the modules based on the dependencies;
obtaining an execution time for each of the modules and determining at least one execution time for each of the cyclic blocks based on the execution times for each of the modules included in each of the cyclic blocks;
sorting the identified cyclic blocks in a traversal order prior to generating a compressed dependency structure matrix;
generating the compressed dependency structure matrix based on the cyclic blocks and the dependencies, at least one leveling table based on the compressed dependency structure matrix, and at least one compressed partition matrix based on the at least one leveling table and the dependencies;
identifying one or more value threads based on the at least one compressed partition matrix;
generating timing information for the computer program based on the identified one or more value threads and the obtained and determined execution times; and
outputting the generated timing information for the computer program.

12. The medium of claim 11, wherein the generating at least one leveling table further comprises applying at least one of an As Early As Possible tagging algorithm, an As Early As Possible leveling algorithm, an As Late As Possible tagging algorithm, or an As Late As Possible leveling algorithm.

13. The medium of claim 11, wherein the generating at least one compressed partition matrix further comprises generating at least one of a compressed As Early As Possible partition matrix or a compressed As Late As Possible partition matrix.

14. The medium of claim 11, wherein the timing information comprises a total execution time for each of the value threads, an early start time for one or more of the modules or cyclic blocks, a late start time for one or more of the modules or cyclic blocks, an early finish time for one or more of the modules or cyclic blocks, a late finish time for one or more of the modules or cyclic blocks.

15. The medium of claim 11, wherein the generating the timing information further comprises performing at least one of a limited resource path analysis or an unlimited resource path analysis.

* * * * *